M. T. BAIRD.
VEHICLE LOCK.
APPLICATION FILED FEB. 17, 1910.
981,907.
Patented Jan. 17, 1911.
7 SHEETS—SHEET 3.
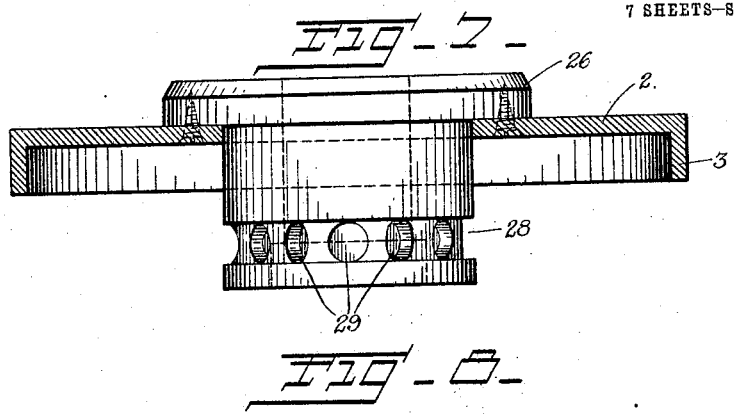
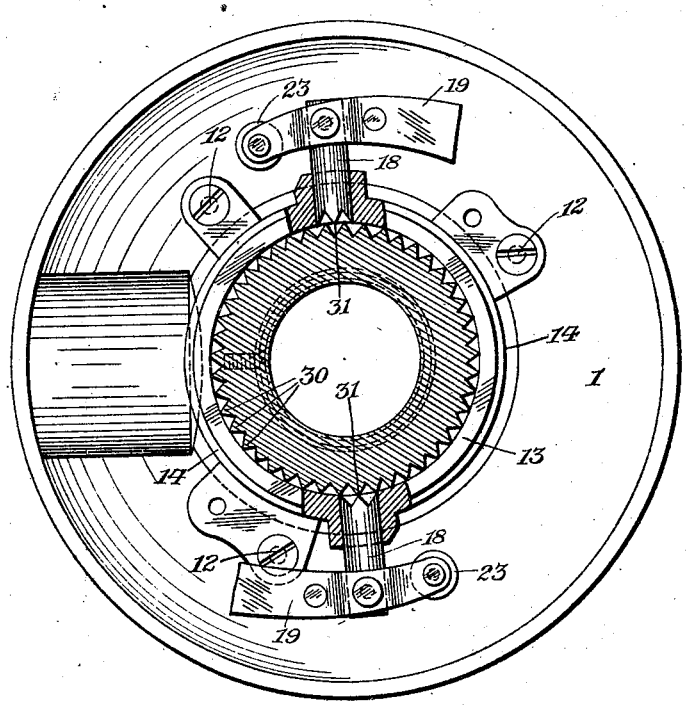
Witnesses:
Chas. A. Becker,
George G. Anderson.
Inventor:
Myron T. Baird,
By Hugh K. Wagner
His Attorney

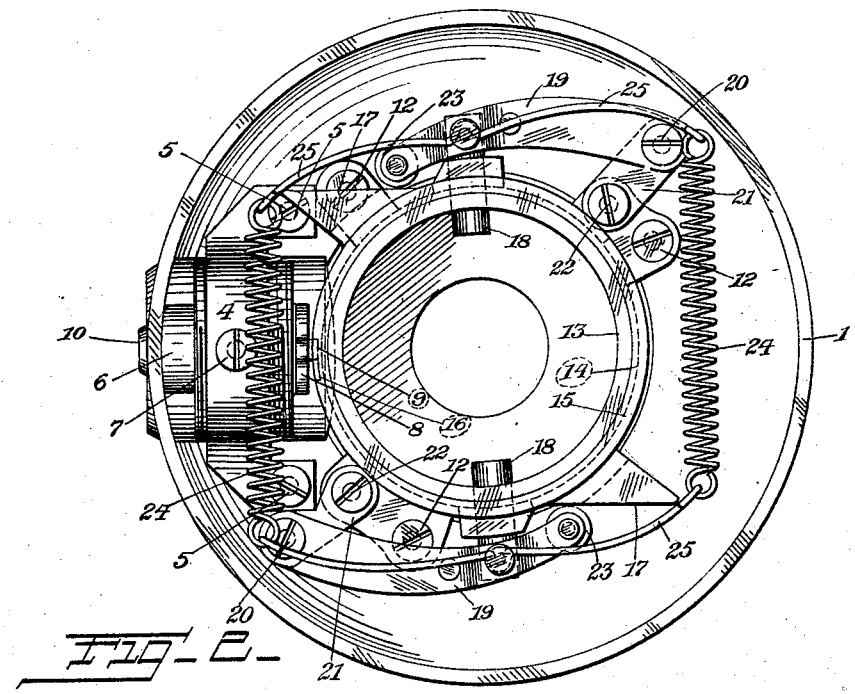

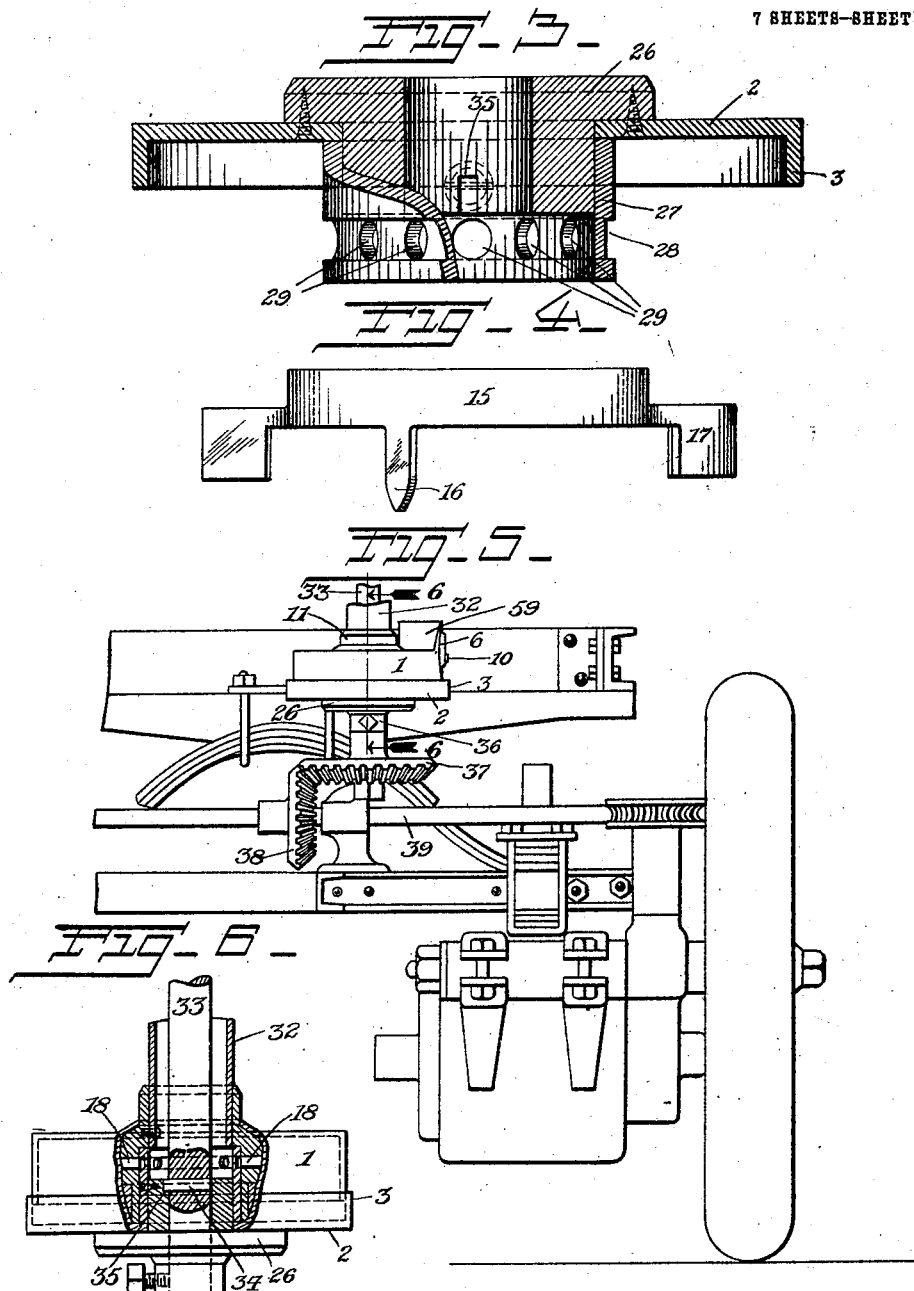

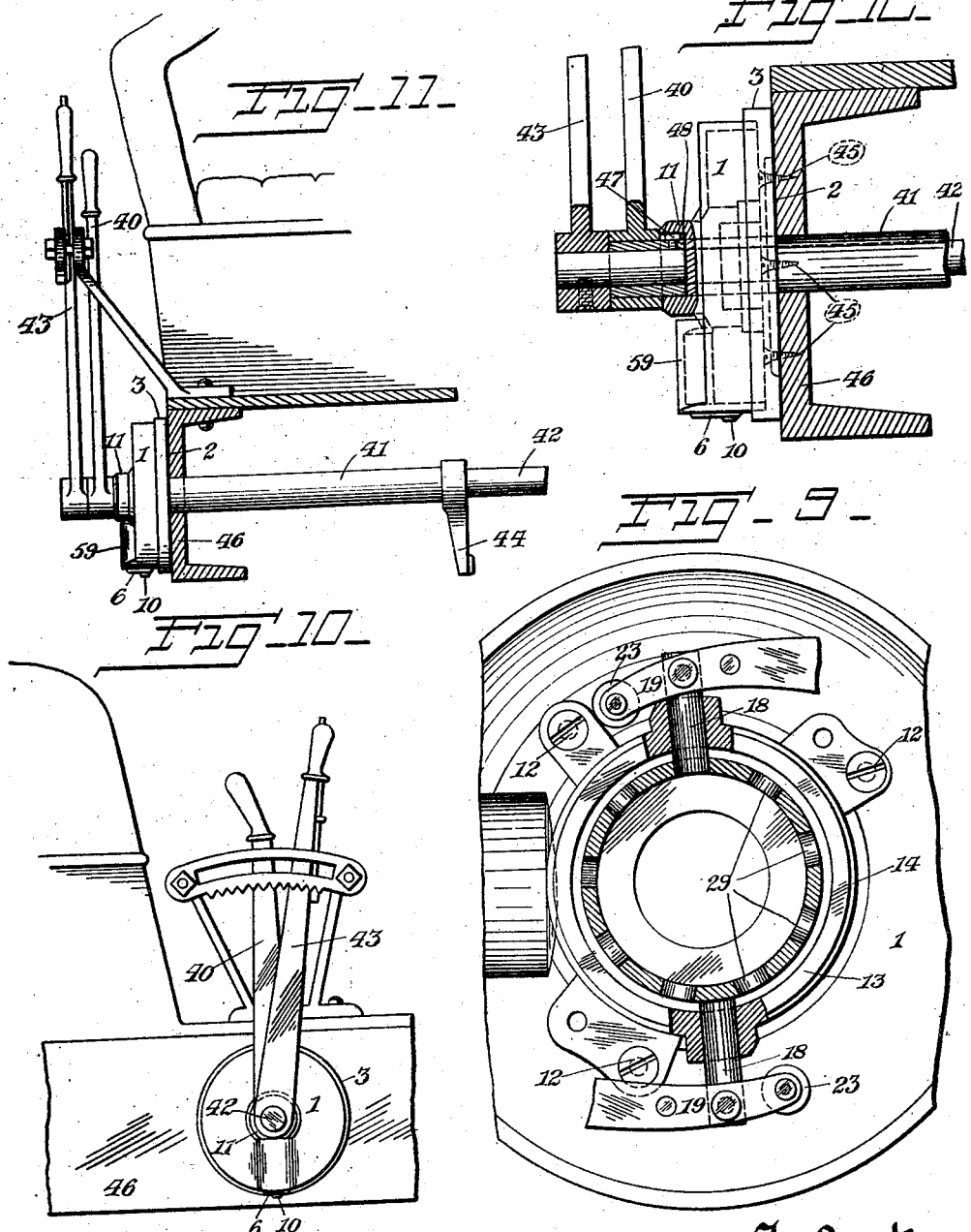

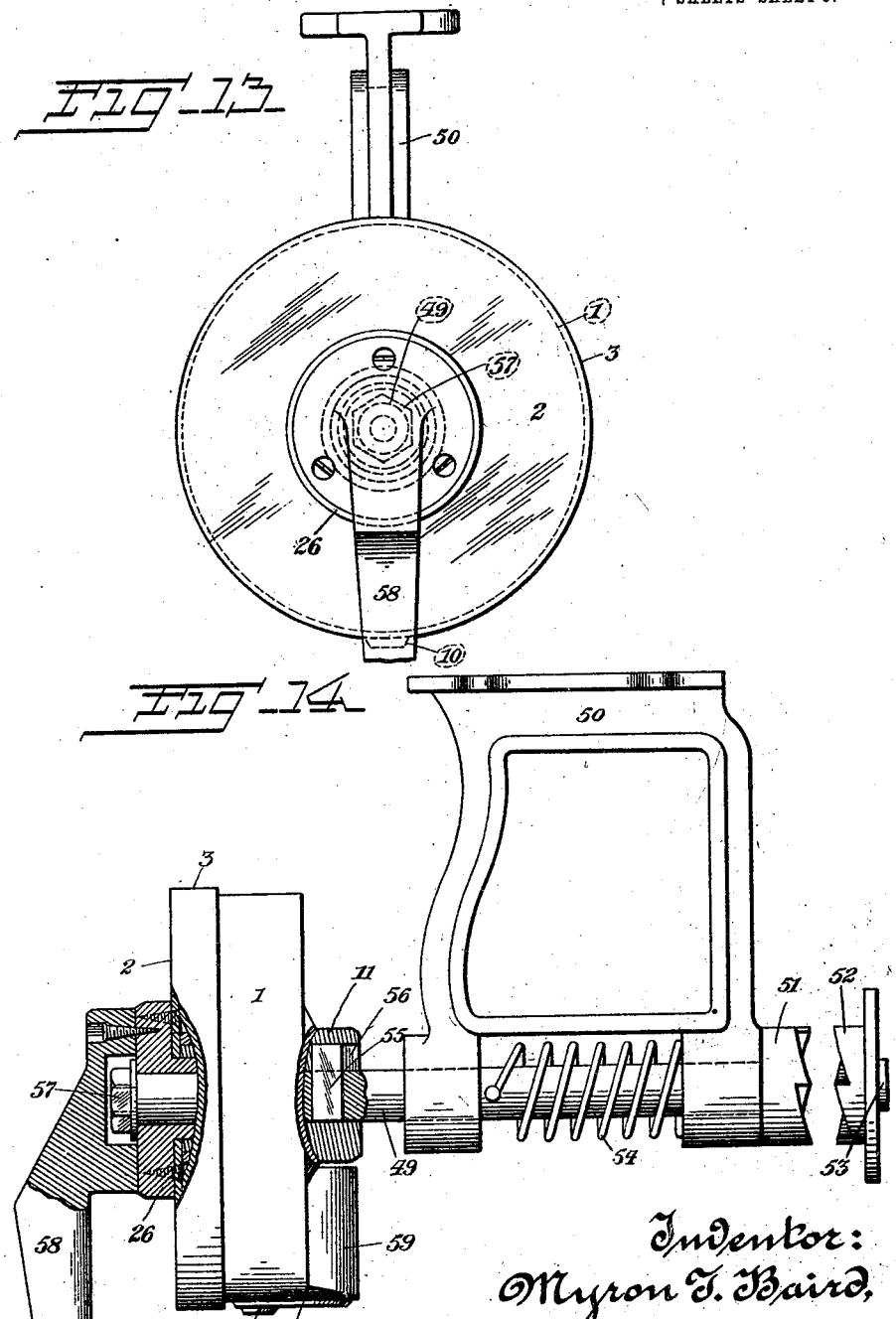

M. T. BAIRD.
VEHICLE LOCK.
APPLICATION FILED FEB. 17, 1910.
981,907.
Patented Jan. 17, 1911.
7 SHEETS—SHEET 6.
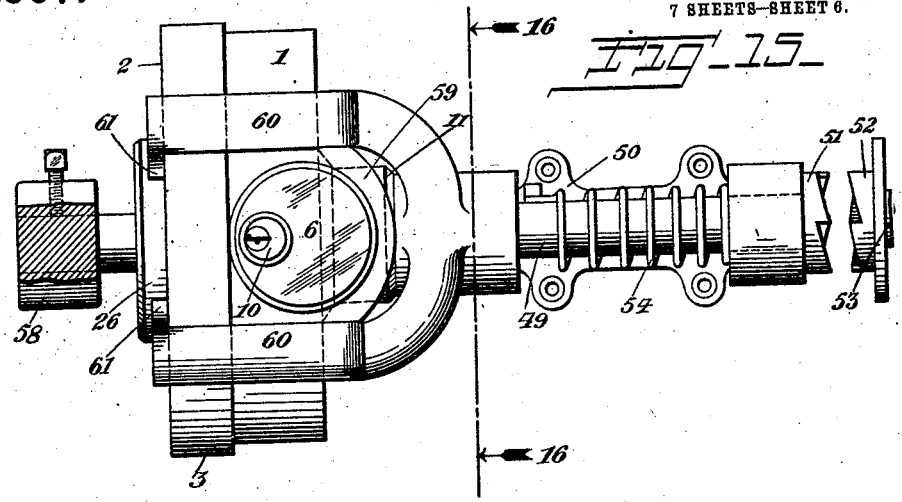
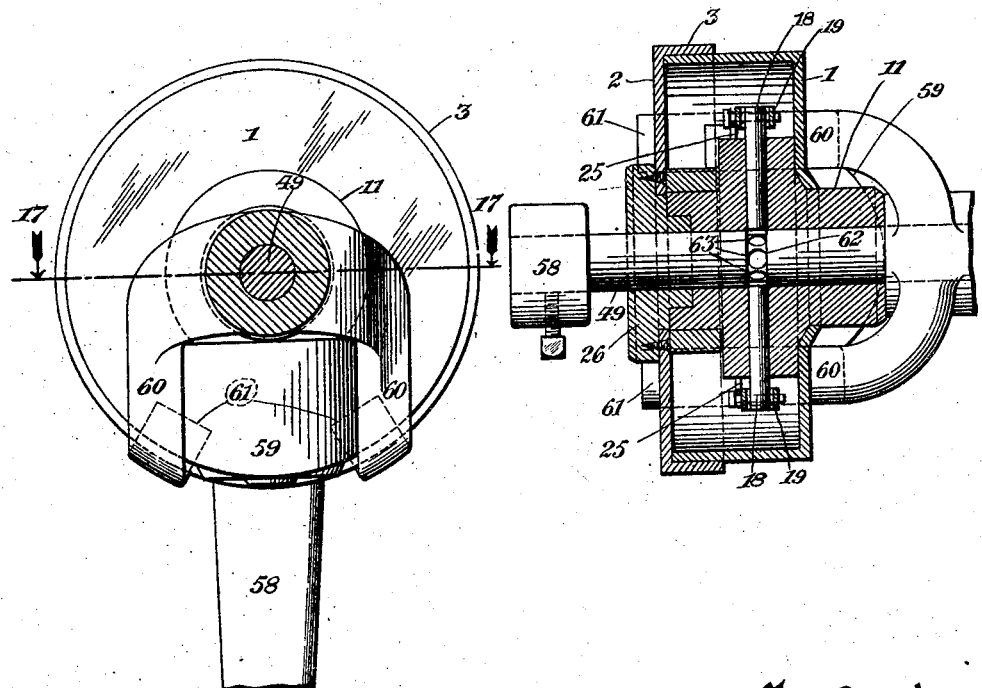

M. T. BAIRD.
VEHICLE LOCK.
APPLICATION FILED FEB. 17, 1910.
981,907.
Patented Jan. 17, 1911.
7 SHEETS—SHEET 7.
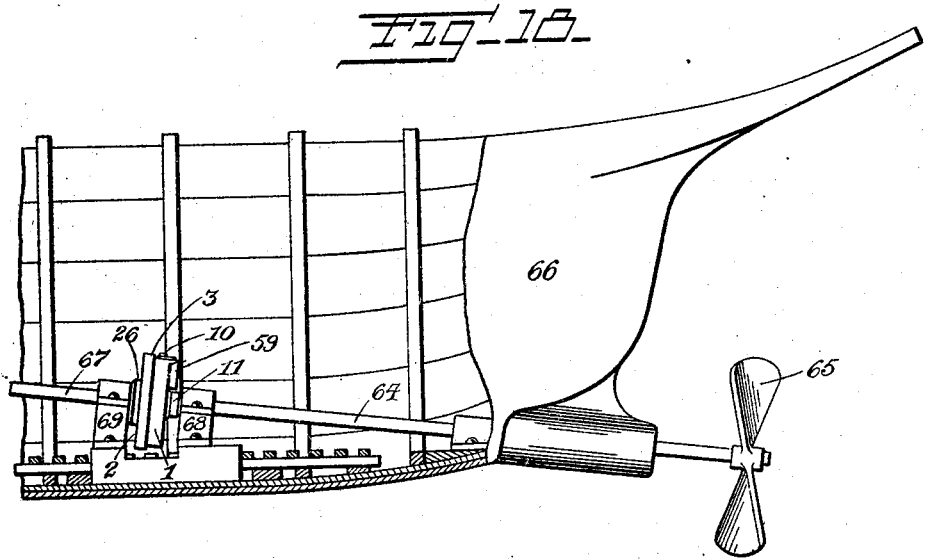
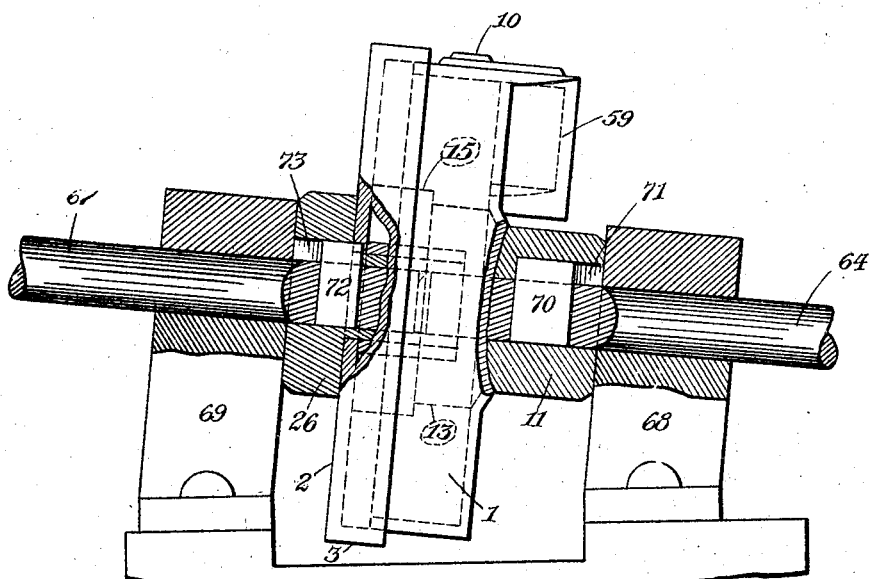
Witnesses:
Chas. A. Becker,
George G. Anderson.
Inventor:
Myron T. Baird,
By Hugh H. Wagner
His Attorney ized by the

UNITED STATES PATENT OFFICE.

MYRON T. BAIRD, OF ST. LOUIS, MISSOURI.

VEHICLE-LOCK.

981,907.

Specification of Letters Patent. Patented Jan. 17, 1911.

Application filed February 17, 1910. Serial No. 544,495.

*To all whom it may concern:*

Be it known that I, MYRON T. BAIRD, a citizen of the United States, residing at the city of St. Louis, State of Missouri, have invented certain new and useful Improvements in Vehicle-Locks, of which the following is a specification, reference being had therein to the accompanying drawings.

This invention consists in the provision of a lock for automobiles, motor boats, and other machines, to prevent their use by unauthorized persons.

This device consists in the arrangement of locking means in conjunction with the operating parts of an automobile, for example, the steering rod, crank shaft, lever or levers for actuating the transmission, etc., or with the propeller shaft of a boat, or with the operating part or parts of other machines. When the lock is in "locked" position, it renders the part or parts to which the device is attached, or with which it is connected, temporarily inoperative.

In the drawings forming part of this specification, in which like numbers of reference denote like parts wherever they occur, Figure 1 is a plan view of the interior part of the device; Fig. 2 is a sectional view showing the operating parts in elevation within the casing; Figs. 3 and 4 are detailed views of parts of the device; Fig. 5 shows the device in conjunction with the steering rod of an automobile; Fig. 6 is a view partly in elevation and partly in section on the line 6—6 of Fig. 5 to show the connection of the device with the steering rod depicted in Fig. 5; Figs. 7 and 8 are detailed views of alternate forms of parts of the device; Fig. 9 is an interior view showing parts of the locking members of the device; Figs. 10, 11, and 12 are views of the device in conjunction with the lever for actuating the transmission of an automobile; Figs. 13 to 17, inclusive, are views showing the device in conjunction with the crank shaft of an automobile; Fig. 16 being a vertical sectional view on the line 16—16 of Fig. 15, and Fig. 17, a horizontal sectional view on the line 17—17 of Fig. 16; and Figs. 18 and 19 are views showing the device in conjunction with the propeller shaft of a boat.

The machine is locked by arranging a lock in connection with a fixed and a loose member and locking the one to the other, one of said members being attached to, or connected with, the stationary and the other being attached to, or connected with, the operative parts of the machine.

The parts of the device are inclosed in a casing 1 which is formed preferably of metal. The cover 2 for casing 1 is provided with a flange 3, said flange being arranged to overlap the edge of said casing in order to prevent access to the interior of said casing. A ring 4 is secured in casing 1 by means of screws 5 or the like, and is screwthreaded internally to receive a screwthreaded portion of a lock 6, a set-screw 7 or other suitable means being used to fasten said lock rigidly in place. Said lock protudes through an opening in the side of casing 1, and is adapted to be operated with a key (not shown in the drawings) from the outside of said casing. An arm 8 bearing a projection 9 is fastened to the inner end of the revoluble member 10 of lock 6, and, when said member is rotated with the key, said arm is caused to rotate therewith.

A hub 11 is fastened by means of screws 12 or in any other suitable manner in casing 1, and extends through an opening in the face of casing 1. A hollow cylindrical portion 13 projects from said hub into the interior of casing 1 and is provided with a larger bore than the bore of said hub and, also, with a shoulder 14 on the exterior surface thereof. A ring 15 bearing a projection 16 is revolubly mounted on the cylindrical portion 13 and rests against shoulder 14. Said projection 16 on ring 15 is disposed in the path of movement of the projection 9 on arm 8, and, when said arm 8 is rotated, in the manner hereinabove described, from the locking position to the unlocked position, or vice versa, said arm causes ring 15 to rotate in one direction or another. Means of any desired type are provided for limiting the extent of movement of ring 15. Said ring 15 bears a cam surface 17 or a plurality of such cam surfaces.

Pins 18 extend through apertures in the cylindrical portion 13 and are preferably located diametrically opposite each other. Each pin 18 is provided with an arm 19 which is attached thereto in any suitable manner, one end of said arm being pivoted at 20 to the member 21 pivoted at 22. A roller 23 is attached to the other end of said arm 19 and is adapted to ride on one of the cam surfaces 17. Springs 24 connect a pair of members 25, one member 25 being attached to one arm 19 and the other member 25 being attached to the other arm 19. When the ring 15 is rotated in one direction, each cam surface 17 causes a roller 23 that rides thereon to move in a direction to cause arm 19 to withdraw pin 18 from the interior of the cylindrical portion 13, but when said ring 15 is rotated in the opposite direction each cam surface 17 allows the springs 24 to draw the pins 18 toward the interior of the cylindrical portion 13, thereby causing said pins to project into the interior of said cylindrical portion.

A hub 26 is secured to the cover 2 and projects into the interior of casing 1. A tube 27, which encircles the part of the hub 26 that projects from the inner face of cover 2, projects into the interior of the cylindrical portion 13 of hub 11, and is secured in any suitable manner either to the hub 26 or to the cover 2 or to both said hub and said cover. Said tube is provided with an annular groove 28 and, also, with a plurality of perforations 29, preferably an odd number, said perforations being spaced at equal distances apart within said groove. The groove 28 alines with the pins 18 so that, when the cam surfaces 17 are in position to allow the pins 18 to project into the interior of the cylindrical portion 13, said pins enter said slot, and, due to the fact that the pins 18 are located diametrically opposite each other and, also, that an odd number of perforations 29 are formed in groove 28, one of said pins 18 enters a perforation 29, thereby preventing the cover 2 from being rotated on the casing 1. When the pins 18 are withdrawn from the interior of the cylindrical portion 13 of hub 11 in the manner hereinabove described, the cover 2 can be rotated on casing 1 or, if desired, said cover can be removed therefrom.

In Fig. 7 an alternate form of the cover 2 is depicted. The tube 27 is omitted entirely and the groove 28 and the perforations 29 are formed in the periphery of the part of hub 26 that projects into the interior of the cylindrical portion 13 of hub 11.

In the alternate form depicted in Fig. 8, teeth 30, preferably an odd number, are formed in the periphery of the hub 26. Each pin 18 is provided with a similar tooth 31, or a plurality of such teeth, and, when the pins 18 are drawn toward the interior of the cylindrical portion 13 of hub 11, the teeth 31 on the end of one of said pins 18 mesh with teeth 30 of the hub 26, whereby the cover 2 is prevented from being rotated on casing 1.

In Figs. 5 and 6 the device is depicted in conjunction with a steering mechanism of an automobile. The hub 11 of casing 1 encircles an end of tube 32 and is fastened thereto by any suitable means, said tube being secured rigidly to the frame of the automobile. The steering rod 33 extends through tube 32 and, also, through the hub 26 of cover 2. A pin or key 34 projects from rod 33 into a notch 35 in hub 26 of said cover in order to cause said cover to rotate with said rod. Said cover is held in engagement with casing 1 by means of a sleeve 36 or the like on rod 33. A beveled gear 37, which is secured to rod 33, meshes with a beveled gear 38 on shaft 39, and, when said rod is rotated, said gear 37 drives gear 38, thereby rotating shaft 39 in order to steer the automobile. When the arm 8 is rotated to a position to cause the cam surfaces 17 on ring 15 to withdraw the pins 18 from the groove 28 of hub 26, the steering rod 33 can be rotated, but when the arm 8 is revolved to cause the cam surfaces 17 to allow the pins 18 to project into the groove 28, one of said pins enters a perforation 29, whereby the cover 2 is locked to the casing 1 and the steering rod 33 is prevented from rotating. It should be understood that the beveled gears 37 and 38 and shaft 39 can be omitted entirely and any other steering mechanism can be substituted therefor.

In Figs. 10, 11, and 12 the device is shown in conjunction with the lever 40 for actuating the transmission of an automobile. Said lever 40 is attached to the tube 41 which is revolubly mounted on shaft 42, an emergency brake lever 43 being fastened to said shaft. The tube 41 passes through the hub 11 of casing 1 and, also, through the hub 26 of cover 2, an arm 44, which is connected to the transmission (not shown in the drawings), being attached to said tube. The cover 2 is secured by means of screws 45 or the like to the frame 46 of the automobile. The head of a screw 47 projects from the tube 41 into a notch 48 in the hub 11 of casing 1 in order to cause said casing to rotate with said tube. The lever 40 can be moved to several positions, viz., one to cause the transmission to run at low speed, one to cause the transmission to run at high speed, one or more to cause the transmission to run at intermediate speed or speeds, and one called a neutral position, i. e., a position to cause the driving means to run idle instead of driving the transmission. In order to lock the lever 40 to make the transmission of the automobile inoperative, said lever is moved to the neutral position and the arm 8 is rotated in the manner hereinabove described to the position to cause pins 18 to enter groove 28 whereby one of said pins enters perforation 29 and locks the casing 1 to the cover 2. The lever 40 is prevented from being rotated from its neutral position until the pins 18 are withdrawn from groove 28.

In Figs. 13 to 17, inclusive, two modes of applying the device to the crank-shaft 49 of an automobile are illustrated. Said shaft 49 is revolubly mounted and, also, slidably mounted in a bracket or support 50 borne by the automobile. A clutch member 51 is fastened to an end of said shaft 49 and is adapted to actuate the clutch member 52 on the shaft 53 of the engine (not shown in the drawings), a spring 54 or the like being attached to said shaft in order to hold the clutch member 51 normally out of engagement with the clutch member 52.

In Figs. 13 and 14 the casing 1 is fastened to shaft 49 by means of a key 55 which projects from said shaft into a notch 56 in the hub 11 of said casing. The cover 2 is revolubly mounted on the outer end of shaft 49, a nut 57 or other suitable means being provided to hold said cover on said shaft. The crank handle 58 is secured in any suitable manner to the hub 26 of cover 2 and preferably covers the nut 57. In order to rotate the crank shaft 49 with the handle 58, it is necessary to lock the casing 1 to the cover 2 in the manner hereinabove described. When the casing 1 is unlocked, i. e., when the pins 18 are withdrawn from groove 28, the handle 58 causes the cover 2 to rotate on shaft 49, thereby preventing the rotation of the clutch member 51.

In Figs. 15, 16, and 17, the shaft 49 extends through the hubs 11 and 26 of the casing 1 and cover 2, respectively, and is adapted either to slide or to rotate therein. An enlarged portion 59 of casing 1 projects between the arms 60 of bracket 50 and prevents said casing from rotating on shaft 49. Each arm 60 is provided with a projection 61 which is adapted to hold the cover 2 on casing 1. The portion of hub 26 that contains the groove 28 and apertures 29 is omitted entirely and a groove 62 and apertures 63 are formed in the periphery of shaft 49. The cylindrical portion 13 of hub 11 is arranged to occupy the space previously occupied by the grooved portion of hub 26, and each pin 18 is lengthened to project into an aperture 63 within groove 62 in shaft 49 when the cam surfaces 17 occupy a position to allow said pins to project into groove 62. Spring 54 holds the shaft 49 normally in position to cause the groove 62 to register in the same plane with the pins 18. When the pins 18 are withdrawn from groove 62 the shaft 49 can be reciprocated or rotated, but when pins 18 are allowed to enter groove 62 one of said pins enters an aperture 63, whereby the shaft 49 is prevented either from being rotated or reciprocated.

In Figs. 18 and 19 the device is shown in conjunction with the shaft 64 to which the propeller 65 for the boat 66 is fastened at the outer end thereof. The inner end of shaft 64 abuts an end of a shaft 67 which is driven by the engine (not shown in the drawings), said shaft 64 being journaled in a journal-box 68 and said shaft 67 being journaled in a journal-box 69. The casing 1 is mounted on the end of shaft 64 and is fastened by means of a key 70 which projects into a notch 71 in the hub 11 of said casing. The cover 2 is mounted on the end of shaft 67, said shaft being provided with a key 72 which projects into notch 73 in the hub 26 in order to cause said cover to rotate with said shaft. When the casing 1 is locked to the cover 2, both shafts 64 and 67 are caused to rotate simultaneously, but the casing 1 is unlocked, and shaft 64 is prevented from rotating with shaft 67.

I claim:

1. In a locking device, the combination of a hollow member, a member adapted to revolve therein, a pivoted member, a pin borne by said pivoted member for connecting said hollow member directly to said revoluble member, a cam adapted to actuate said pivoted member, and means for actuating said cam.

2. In a locking device, the combination of a hollow member, a member adapted to revolve therein, a pivoted member, a pin borne by said pivoted member for connecting said hollow member directly to said revoluble member, a cam adapted to actuate said pivoted member, and a key-operated member for actuating said cam.

3. In a locking device, the combination of a hollow member, a member adapted to revolve therein, a member provided with means for connecting said hollow member to said revoluble member, and an actuating member for the last-named member encircling said hollow member.

4. In a locking device, the combination of a hollow member, a member adapted to revolve therein, a member provided with means for connecting said hollow member to said revoluble member, and a member encircling said hollow member and provided with a cam for actuating the last-named member.

5. In a locking device, the combination of a hollow member, a member adapted to revolve therein, a pivoted member provided with means for connecting said hollow member to said revoluble member, and a member encircling said hollow member and provided with a cam for actuating said pivoted member.

6. In a locking device, the combination of a hollow member provided with an opening, a member adapted to revolve in said hollow member and having apertures registering with said opening, a pivoted member provided with a pin adapted to reciprocate in said opening, means to cause said pin to enter an aperture in said revoluble member to connect the latter directly to said hollow member, and a cam arranged to act upon said pivoted member to withdraw said pin from said aperture.

7. In a locking device, the combination of a hollow member, a member adapted to revolve therein, a reciprocatory member for connecting said hollow member to said revoluble member, means for holding said reciprocatory member in engagement with said revoluble member, a sleeve encircling said hollow member and provided with a cam for withdrawing said reciprocatory member from such engagement, and means for revolving said sleeve.

8. In a locking device, the combination of a hollow member, a member adapted to revolve therein, a reciprocatory member for connecting said hollow member to said revoluble member, means for holding said reciprocatory member in engagement with said revoluble member, a pivoted member for withdrawing said reciprocatory member from such engagement, a sleeve encircling said hollow member and provided with means for actuating said pivoted member, and means for revolving said sleeve.

9. In a locking device, the combination of a hollow member, a member adapted to revolve therein, a connecting member, an actuating member for said connecting member encircling said hollow member and provided with a projection, and a key-operated member provided with a projection adapted to engage the first-named projection, for operating said actuating member.

10. In a locking device, the combination of a hollow member, a member adapted to revolve therein, a connecting member, a sleeve revolubly mounted on said hollow member for actuating said connecting member, said sleeve being provided with a projection, and a key-operated member provided with a projection adapted to engage the projection on said sleeve for revolving the latter.

11. In a locking device, the combination of a hollow member, a member adapted to revolve therein, a pivoted member, a member borne by said pivoted member and adapted to connect said hollow member with said revoluble member, a movable member bearing a cam surface, a roller borne by said pivoted member and adapted to ride on said cam surface, and a separate member for actuating said cam-bearing member.

12. In a locking device, the combination of a hollow member having an opening, a member adapted to revolve in said hollow member and having apertures registering with said opening, a member adapted to reciprocate in said opening, means to cause said reciprocatory member to enter an aperture in said revoluble member, a pivoted member adapted to withdraw said reciprocatory member from said aperture, a cam adapted to actuate said pivoted member, and means for actuating said cam.

13. In a locking device, the combination of a hollow member having an opening, a member adapted to revolve in said hollow member and having apertures registering with said opening, a member adapted to reciprocate in said opening, means to cause said reciprocatory member to enter an aperture in said revoluble member, a pivoted member adapted to withdraw said reciprocatory member from said aperture, a revoluble sleeve having a cam surface, a roller borne by said pivoted member and adapted to ride on said cam surface, and a separate member adapted to revolve said sleeve.

14. In a locking device, the combination of a hollow member having an opening, a member adapted to revolve in said hollow member and having an annular groove registering with said opening, said revoluble member being provided with apertures within said groove, a member adapted to reciprocate in said opening, means to cause said reciprocatory member to enter an aperture in said revoluble member, means adapted to withdraw said reciprocatory member from said aperture, and means for actuating said withdrawing means.

In testimony whereof I have affixed my signature in presence of two witnesses.

MYRON T. BAIRD.

Witnesses:
GLADYS WALTON,
ADELAIDE E. O'BRIEN.